US011320011B2

United States Patent
Morio et al.

(10) Patent No.: US 11,320,011 B2
(45) Date of Patent: May 3, 2022

(54) CALIPER FOR OPPOSED PISTON-TYPE DISC BRAKE

(71) Applicant: AKEBONO BRAKE INDUSTRY CO., LTD., Tokyo (JP)

(72) Inventors: Takefumi Morio, Tokyo (JP); Ryo Otake, Tokyo (JP); Razif Muhammad Zainudin, Tokyo (JP)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 72 days.

(21) Appl. No.: 16/643,968

(22) PCT Filed: Aug. 31, 2018

(86) PCT No.: PCT/JP2018/032493
§ 371 (c)(1),
(2) Date: Mar. 3, 2020

(87) PCT Pub. No.: WO2019/049801
PCT Pub. Date: Mar. 14, 2019

(65) Prior Publication Data
US 2020/0408266 A1    Dec. 31, 2020

(30) Foreign Application Priority Data

Sep. 6, 2017   (JP) .............................. JP2017-170802

(51) Int. Cl.
*F16D 55/228*   (2006.01)
*F16D 65/00*    (2006.01)
(Continued)

(52) U.S. Cl.
CPC ....... *F16D 65/0075* (2013.01); *F16D 55/228* (2013.01); *F16D 65/183* (2013.01); *F16D 2055/002* (2013.01); *F16D 2121/04* (2013.01)

(58) Field of Classification Search
CPC .... F16D 55/228; F16D 65/0075; F16D 65/02; F16D 65/183
(Continued)

(56) References Cited

U.S. PATENT DOCUMENTS 4,699,254 A    10/1987 Mery
5,620,063 A *  4/1997 Smith ................... F16D 55/228
                                                    188/240

(Continued)

FOREIGN PATENT DOCUMENTS

CN    A-102900792    1/2013
CN    A-103671640    3/2014
(Continued)

OTHER PUBLICATIONS

Extended European Search Report dated Feb. 10, 2021 in corresponding European patent application 18852976.2 (6 pages).
(Continued)

*Primary Examiner* — Christopher P Schwartz
(74) *Attorney, Agent, or Firm* — Faegre Drinker Biddle & Reath LLP

(57) ABSTRACT

A caliper for an opposed-piston disc brake, includes a pair of bodies provided at two sides of a rotor that rotates with a wheel, each of the bodies including five cylinders. A central cylinder among the five cylinders provided on each of the bodies, which is surrounded by four of the cylinders, has a center which is located in a region on a radially inner side relative to an outer reference circle and on a radially outer side relative to an inner reference line. The outer reference circle passes through a center of a cylinder provided on a radially outermost side among the four of the cylinders and has a center thereof on a center of the rotor.

(Continued)

The inner reference line passes through centers of two of the cylinders provided on a radially inner side among the four of the cylinders.

5 Claims, 13 Drawing Sheets

(51) Int. Cl.
  *F16D 65/18* (2006.01)
  *F16D 55/00* (2006.01)
  *F16D 121/04* (2012.01)
(58) Field of Classification Search
  USPC .............................. 188/73.1, 73.2, 72.4, 72.5
  See application file for complete search history.

(56) References Cited

U.S. PATENT DOCUMENTS

| | | | |
|---|---|---|---|
| 10,539,199 B2* | 1/2020 | Wilson | F16D 65/183 |
| 2010/0187050 A1 | 7/2010 | Hayashi et al. | |
| 2013/0092481 A1 | 4/2013 | Crippa et al. | |
| 2013/0240305 A1 | 9/2013 | Thomas et al. | |
| 2016/0238094 A1 | 8/2016 | Gutelius et al. | |
| 2019/0316641 A1* | 10/2019 | Morio | F16D 65/02 |

FOREIGN PATENT DOCUMENTS

| | | |
|---|---|---|
| CN | B-103307148 | 3/2016 |
| EP | 0 710 777 A2 | 5/1996 |
| EP | A1-2713075 | 4/2014 |
| GB | A-2012012 | 7/1979 |
| JP | UM-A-S62-114226 | 7/1987 |
| JP | H05-40630 U | 6/1993 |
| JP | A-2005-206077 | 8/2005 |
| JP | 2013-29197 A | 2/2013 |
| JP | 2015-161354 A | 9/2015 |
| JP | 2016-223537 A | 12/2016 |
| KR | A-2006-0016256 | 2/2006 |
| SE | B-426867 | 2/1983 |
| WO | WO-A1-2017-085619 | 5/2017 |

OTHER PUBLICATIONS

International Search Report dated Oct. 9, 2018 for PCT/JP2018/032493.
International Search Report/Written Opinion dated Oct. 9, 2018 for PCT/JP2018/032493.
Office Action issued in CN 201880058077.0 dated Dec. 1, 2020 and English translation.

* cited by examiner

--Prior Art--

CALIPER FOR OPPOSED PISTON-TYPE DISC BRAKE

TECHNICAL FIELD

The present invention relates to a caliper that constitutes an opposed-piston disc brake used for braking a vehicle such as an automobile.

BACKGROUND ART

A disc brake is widely used to brake an automobile. During braking by the disc brake, a pair of pads provided at two axial sides of a rotor rotating together with a wheel are pressed against two axial side surfaces of the rotor by pistons. Although various types of structures in the related art are known as such disc brakes, an opposed-piston disc brake including pistons facing each other at two axial sides of a rotor has been increasingly used in recent years since a stable braking force can be obtained.

FIG. 13 shows a caliper 1 for an opposed-piston disc brake having a structure in the related art, which is described in Japanese Patent Application Publication No. 2013-29197. The caliper 1 is mounted on a high performance vehicle such as a sports car and includes five cylinders 4a to 4e in each of a pair of bodies 3 provided at two axial sides of a rotor 2.

Among the five cylinders 4a to 4e, centers of three cylinders 4a to 4c provided on a radially outer side are located on the same imaginary circle α about the center of the rotor 2. In contrast, centers of two cylinders 4d, 4e provided on a radially inner side are located on the same imaginary circle 13 about the center of the rotor 2. The two cylinders 4d, 4e provided on the radially inner side are located between the cylinder 4a, which is located in middle in the circumferential direction among the three cylinders 4a to 4c provided on the radially outer side, and the cylinders 4b, 4c located at two sides of the cylinder 4a.

CITATION LIST

Patent Literature

Patent Literature 1: JP-A-2013-29197

SUMMARY OF INVENTION

Technical Problem

In the above-mentioned structure in the related art, the three cylinders 4a to 4c are provided on the radially outer side, whereas only two cylinders 4d, 4e are provided on the radially inner side. Accordingly, uneven wear is likely to occur in a radially outer part of pads pressed by five pistons fitted to the five cylinders 4a to 4e. That is, the pads are more likely to wear on the radially outer side than on the radially inner side. For this reason, the braking performance and the acoustic noise performance may be affected.

The present invention is made in view of the above circumstance and an object thereof is to implement a structure capable of preventing uneven wear of pads relative to a caliper for an opposed-piston disc brake including five cylinders in each of a pair of bodies.

Solution to Problem

The object of the present invention is achieved by the following configuration.

(1) A caliper for an opposed-piston disc brake, including:
a pair of bodies provided at two sides of a rotor that rotates with a wheel, each of the pair of bodies including five cylinders, wherein
a central cylinder among the five cylinders provided on each of the pair of bodies, which is surrounded by four of the cylinders, has a center which is located in a region on a radially inner side relative to an outer reference circle and on a radially outer side relative to an inner reference line, the outer reference circle passes through a center of a cylinder provided on a radially outermost side among the four cylinders and has a center thereof on a center of the rotor, and the inner reference line passes through centers of two of the cylinders provided on a radially inner side among the four of the cylinders.

The cylinder provided on the radially outermost side among the four cylinders may be one cylinder or two cylinders provided on the same imaginary circle (the outer reference circle) centered on the center of the rotor. Therefore, at least one cylinder is provided on the radially outer side relative to the central cylinder and at least two cylinders are provided on the radially inner side relative to the central cylinder. Further, at least one cylinder is provided separately on one circumferential side and on the other circumferential side relative to the central cylinder.

(2) In the caliper for an opposed-piston disc brake according to (1),
each of the pair of bodies has a through hole provided on the radially outer side relative to the central cylinder provided on each of the pair of bodies, and the through hole penetrates in an axial direction.

When the through hole is located on the radially outer side relative to the central cylinder, the through hole and the central cylinder do not necessarily overlap in the radial direction.

(3) In the caliper for an opposed-piston disc brake according to (2),
an imaginary plane intersecting with the central cylinder among imaginary planes including a central axis of the rotor intersects with the through hole.

(4) In the caliper for an opposed-piston disc brake according to (3),
the imaginary plane passes through the center of the central cylinder and a center of the through hole.

(5) In the caliper for an opposed-piston disc brake according to any one of (3) and (4),
a center bridge is provided on a radially outer side relative to an outer peripheral edge of the rotor and connects circumferentially central portions of the pair of bodies to each other, a bridge hole is provided on the center bridge and penetrates in a radial direction, and an imaginary plane among the imaginary planes including the central axis of the rotor, which intersects with the bridge hole, intersects with the central cylinder provided on each of the pair of bodies and the through hole.

Advantageous Effects of Invention

According to the present invention having the above configuration, it is possible to prevent uneven wear of pads relative to a caliper for an opposed-piston disc brake including five cylinders in each of a pair of bodies.

DESCRIPTION OF EMBODIMENTS

First Embodiment

Figure 1:
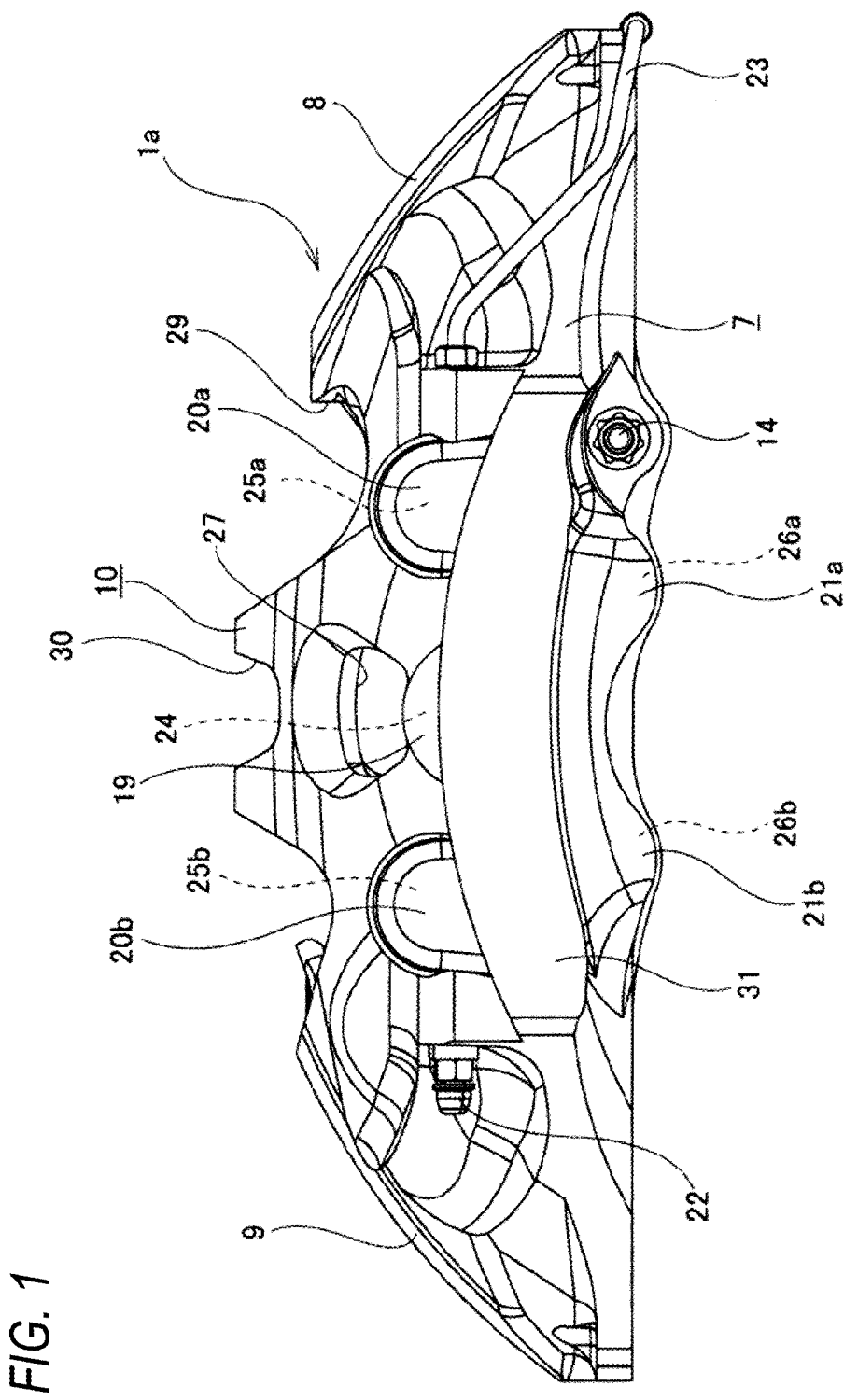
FIG. 1 is a view of an opposed-piston disc brake according to a first embodiment of the present invention as viewed from an axially outer side.
Figure 2:
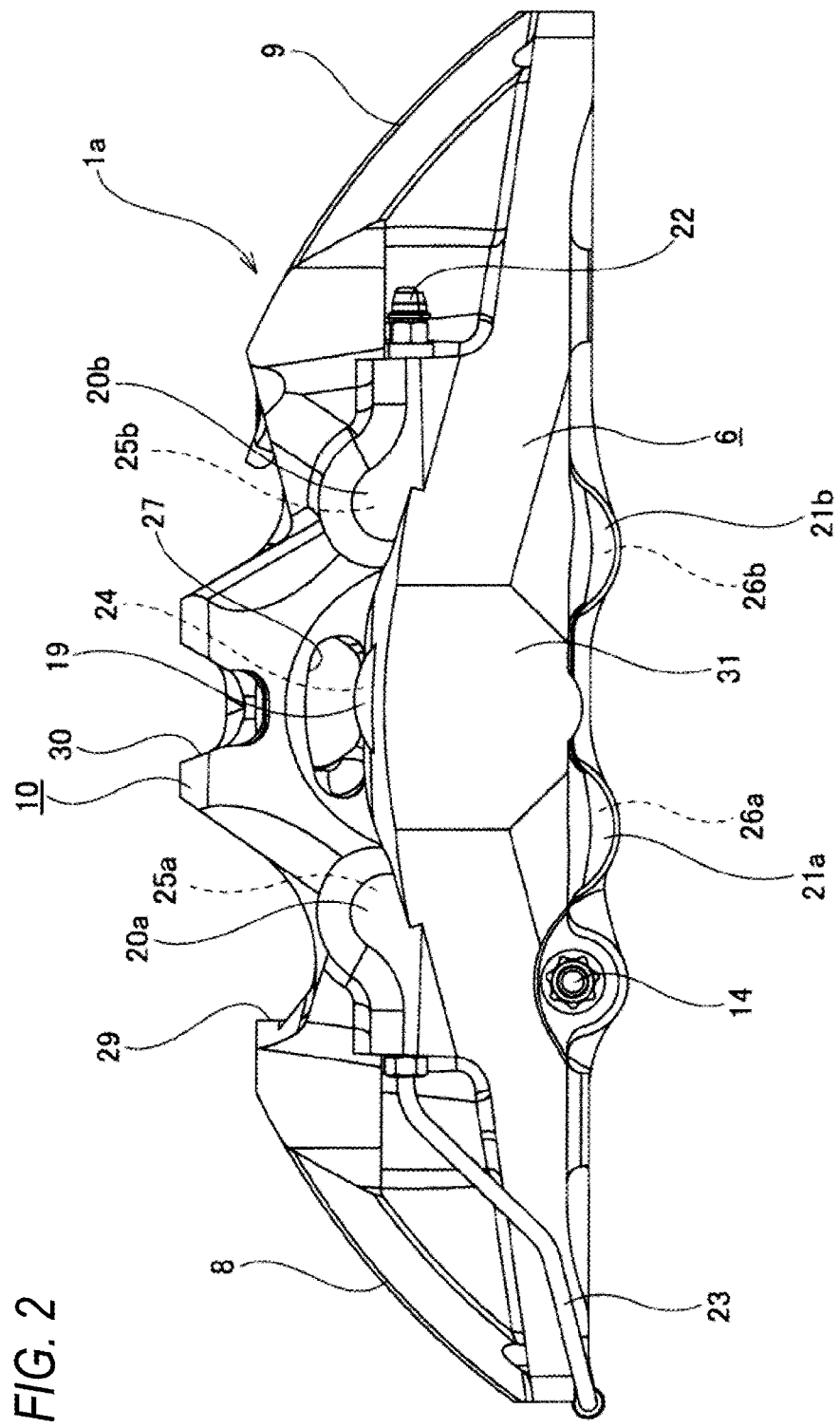
FIG. 2 is a view of the opposed-piston disc brake according to the first embodiment of the present invention as viewed from an axially inner side.
Figure 3:
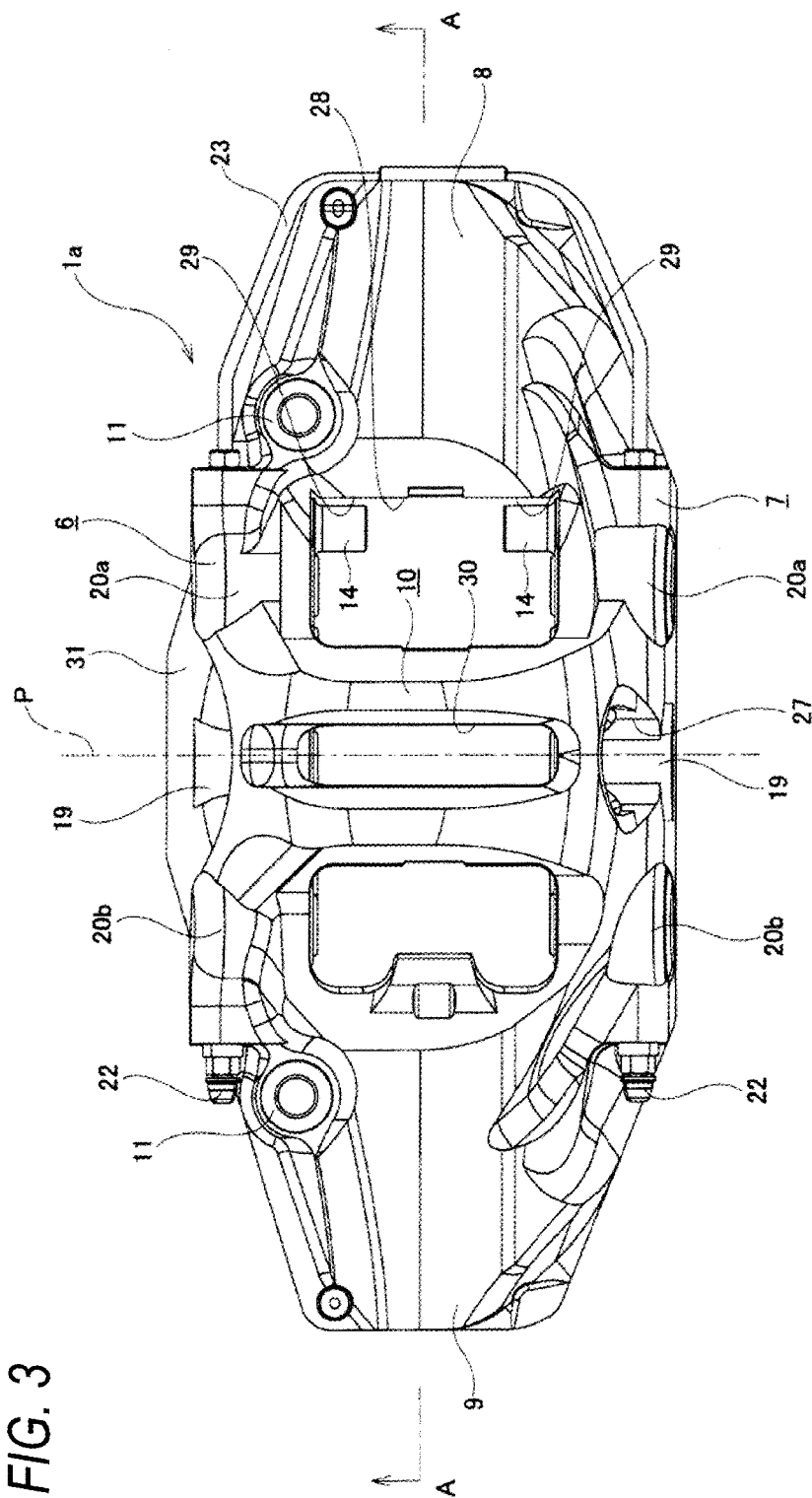
FIG. 3 is a view of the opposed-piston disc brake according to the first embodiment of the present invention as viewed from a radially outer side.
Figure 4:
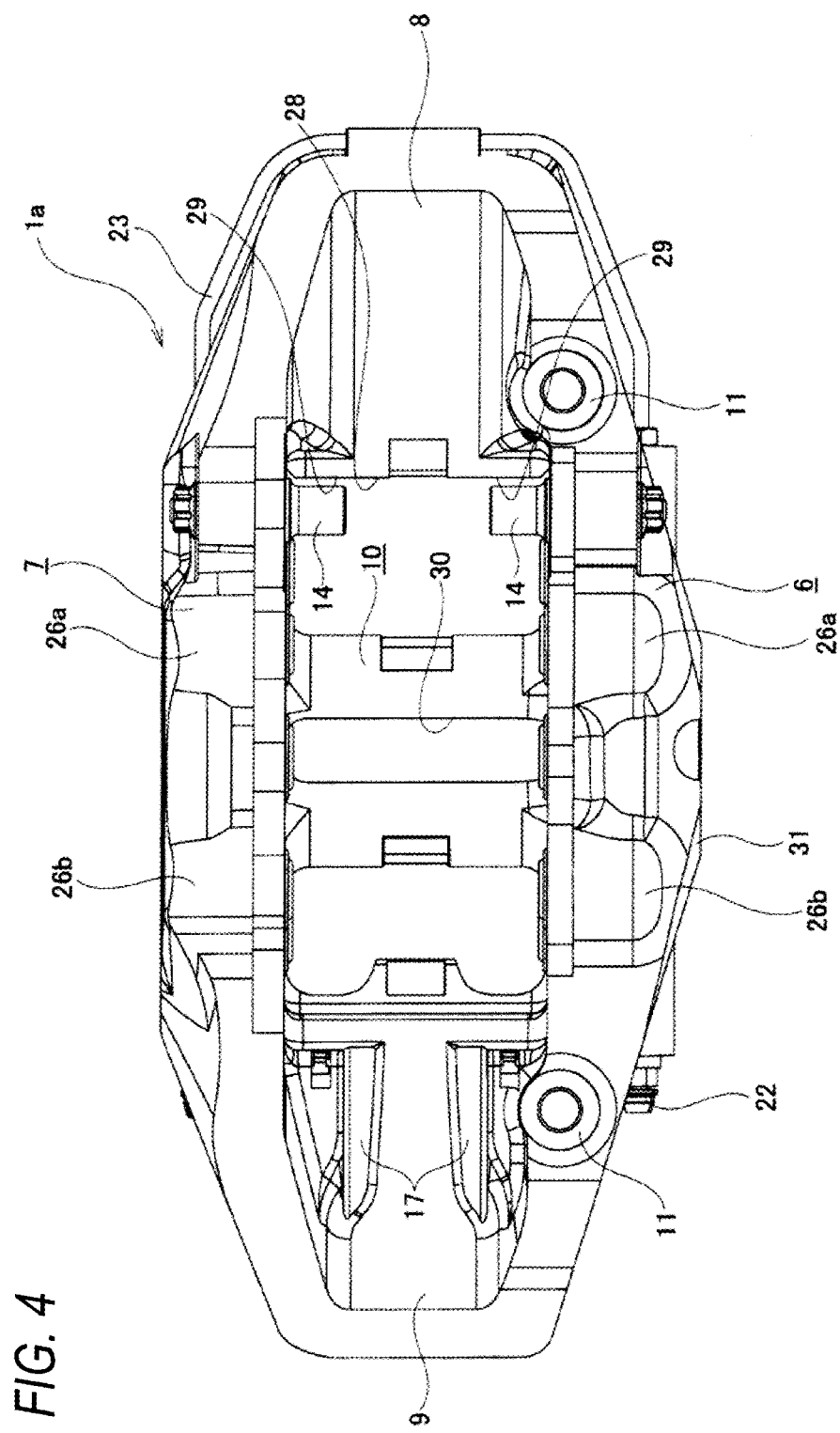
FIG. 4 is a view of the opposed-piston disc brake according to the first embodiment of the present invention as viewed from a radially inner side.

A first embodiment of the present invention will be described with reference to FIGS. 1 to 8.

An opposed-piston disc brake in the present embodiment is mounted on a high-performance vehicle such as a sports car and roughly includes a caliper 1a and a pair of pads 5 (an inner pad and an outer pad).

The caliper 1a supports the pair of pads 5 to be movable in the axial direction (the front-back direction of FIGS. 1, 2, 5, and 6 and upper-lower direction of FIGS. 3 and 4) and is integrally formed by, for example, casting a light alloy such as an aluminum alloy or an iron-based alloy material.

The caliper 1a includes an inner body 6 and an outer body 7 which are a pair of bodies provided at two axial sides of a circular plate-shaped rotor 2 (see FIG. 5) that rotates together with a wheel, a rotation-in connection portion 8 and a rotation-out connection portion 9 that connect two circumferential end portions of the inner body 6 and the outer body 7, and a center bridge 10 that connects circumferentially central portions of the inner body 6 and the outer body 7 to each other. The caliper 1a has a substantially arcuate shape as viewed in the axial direction and is supported and fixed to a vehicle body (a knuckle of a suspension device) using a pair of attachment portions 11 provided on the inner body 6.

Terms "axial direction", "radial direction", and "circumferential direction" in the present specification refer to "axial direction", "radial direction", and "circumferential direction" relative to the rotor 2, respectively, unless otherwise specified. Further, "radially outer side" refers to a side far from a center $O_r$ of the rotor 2, and "radially inner side" refers to a side close to the center $O_r$ of the rotor 2.

Each of the pair of pads 5 includes a lining (a friction material) 12 and a metal pressure plate (a back plate) 13 that supports a back surface of the lining 12.

In order to support the pair of pads 5 to be movable in the axial direction, each of the inner body 6 and the outer body 7 is provided with a pad pin 14 and a guide groove 15. Specifically, pad pins 14 are coaxially supported (fixed) to each other at a radially inner end of one circumferential part (a rotation-in part) of each of the inner body 6 and the outer body 7. Each of the pad pins 14 is inserted into a through hole 16 formed in a radially inner end of one circumferential end portion (a rotation-in end portion) of the pressure plate 13. Accordingly, circumferential end portions of the pair of pads 5 are supported to be movable in the axial direction, and a brake tangential force acting on the pair of pads 5 during forward braking is supported by the pad pins 14. In addition, a guide wall portion 17 protruding in the axial direction is provided on an axial side surface of the other circumferential part (a rotation-out part) of each of the inner body 6 and the outer body 7. The axial side surfaces of the inner body 6 and the outer body 7 face each other. An ear portion 18 formed at the other circumferential end portion (a rotation-out end portion) of the pressure plate 13 is engaged with the guide groove 15, which is provided in the guide wall portion 17, to be movable in the axial direction.

Five cylinders are provided on each of the inner body 6 and the outer body 7 so that the pair of pads 5 supported as described above are separately pressed toward axial side surfaces of the rotor 2. That is, each of the inner body 6 and the outer body 7 is provided with one central cylinder 19, two radially outer cylinders 20a, 20b, and two radially inner cylinders 21a, 21b. Openings of the five cylinders 19, 20a, 20b, 21a, and 21b provided on the inner body 6 and openings of the five cylinders 19, 20a, 20b, 21a, and 21b provided on the outer body 7 are provided at symmetrical positions facing each other in the axial direction. In the present embodiment, the five cylinders 19, 20a, 20b, 21a, and 21b have the same cylinder diameter.

The central cylinder 19 is surrounded by four cylinders 20a, 20b, 21a, and 21b (two radially outer cylinders 20a, 20b, and two radially inner cylinders 21a, 21b). In other words, cylinders (two in the illustrated example) are separately provided at two circumferential sides and two radial sides of the central cylinder 19. The central cylinder 19 is provided in a circumferentially central portion and radially central portion of each of the inner body 6 and the outer body 7. A center $O_{19}$ of the central cylinder 19 is located at a position slightly shifting to the other circumferential side (a rotation-out side) from an imaginary line C passing through the center $O_r$ of the rotor 2 and the circumferentially central portions of the inner body 6 and the outer body 7.

The radially outer cylinders 20a, 20b are provided on the radially outer side among the four cylinders 20a, 20b, 21a, and 21b and at radially outer parts of the inner body 6 and the outer body 7. The radially outer cylinders 20a, 20b are provided on the radially outer side relative to the central cylinder 19 and at two sides of the central cylinder 19 in the circumferential direction. Centers $O_{20a}$, $O_{20b}$ of the radially outer cylinders 20a, 20b are located on the same imaginary circle centered on the center $O_r$ of the rotor 2. Therefore, in the present embodiment, cylinders provided at a radially outermost side among the four cylinders 20a, 20b, 21a, and 21b are the two radially outer cylinders 20a, 20b, and the imaginary circle passing through the centers $O_{20a}$, and $O_{20b}$ of the two radially outer cylinders 20a, 20b is an outer reference circle $R_O$. The radially outer cylinders 20a, 20b are provided at positions symmetrical relative to the imaginary line C.

The radially inner cylinders 21a, 21b are provided on the radially inner side among the four cylinders 20a, 20b, 21a, and 21b and at radially inner end portions of the inner body 6 and the outer body 7. The radially inner cylinders 21a, 21b are provided on the radially inner side relative to the central cylinder 19 and at two sides of the central cylinder 19 in the circumferential direction. The radially inner cylinders 21a, 21b are not provided at positions symmetrical relative to the imaginary line C. Specifically, a distance from a center $O_{21a}$ of the radially inner cylinder 21a provided on one circumferential side to the imaginary line C is smaller than a distance from a center $O_{21b}$ of the radially inner cylinder 21b provided on the other circumferential side to the imaginary line C. That is, the two radially inner cylinders 21a, 21b are provided at positions shifting to the other circumferential side relative to the imaginary line C. A circumferential distance between the pair of radially inner cylinders 21a, 21b is shorter than a circumferential distance between the pair of radially outer cylinders 20a, 20b.

Figure 5:
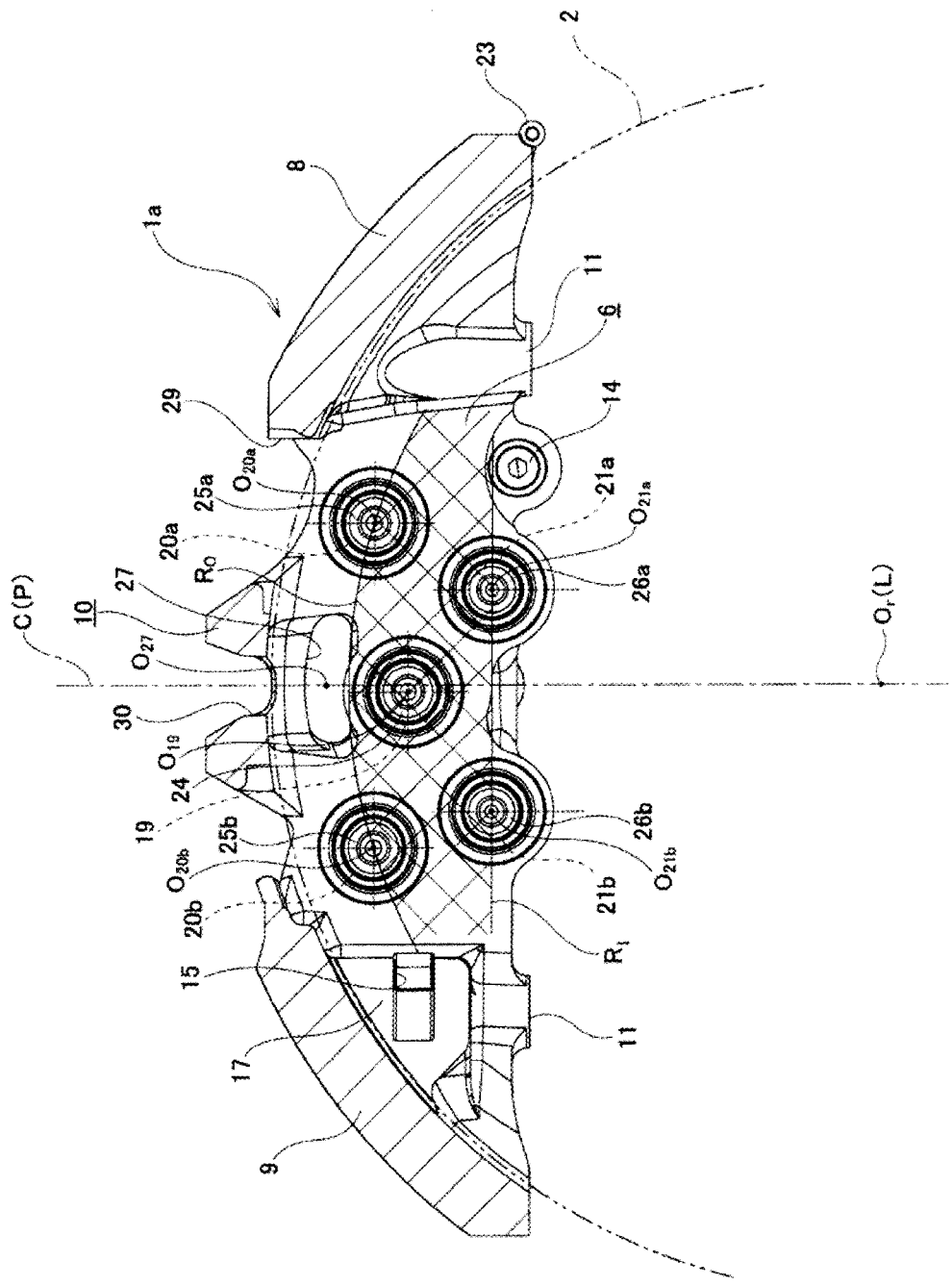
FIG. 5 is a cross-sectional view taken along a line A-A in FIG. 3.
Figure 6:
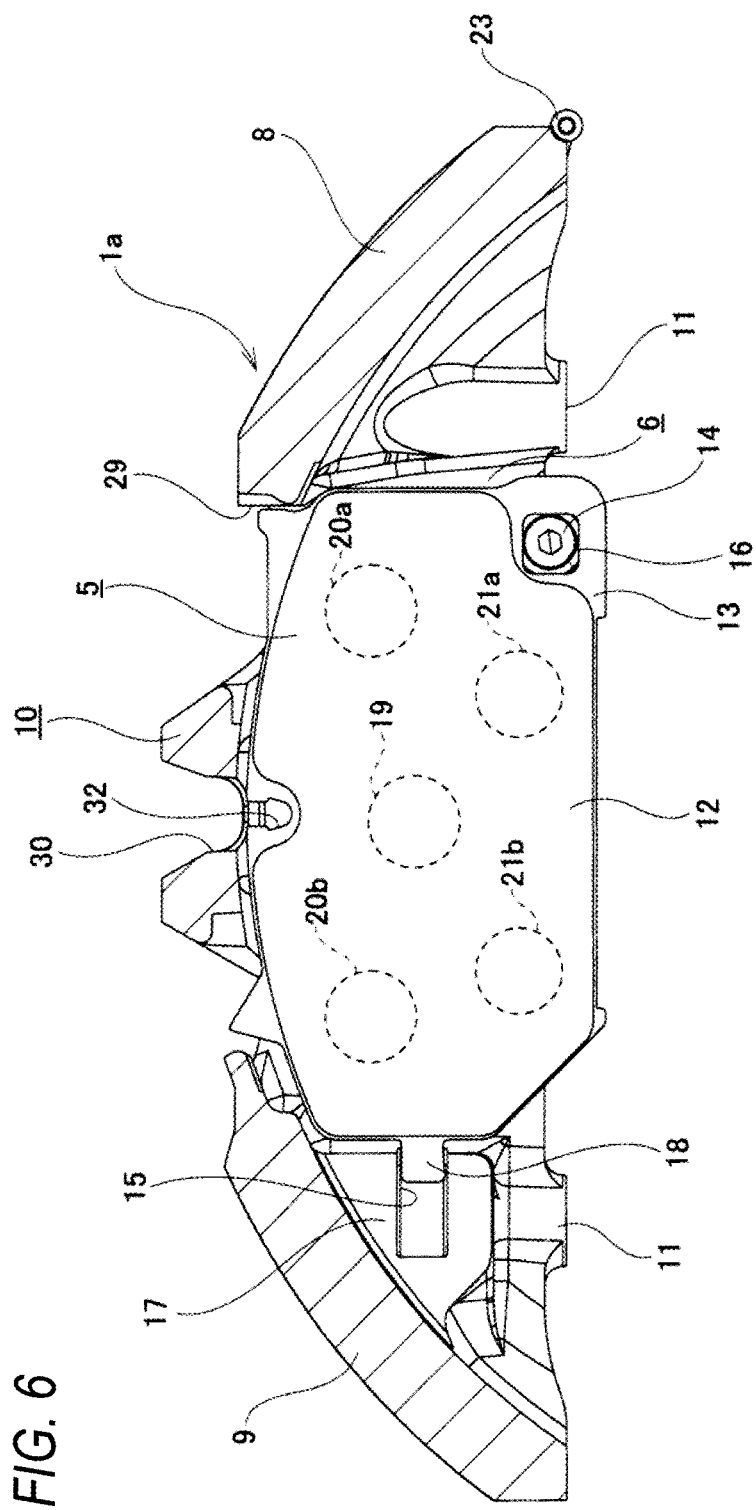
FIG. 6 shows a state in which a pad is assembled to FIG. 5.
Figure 7:
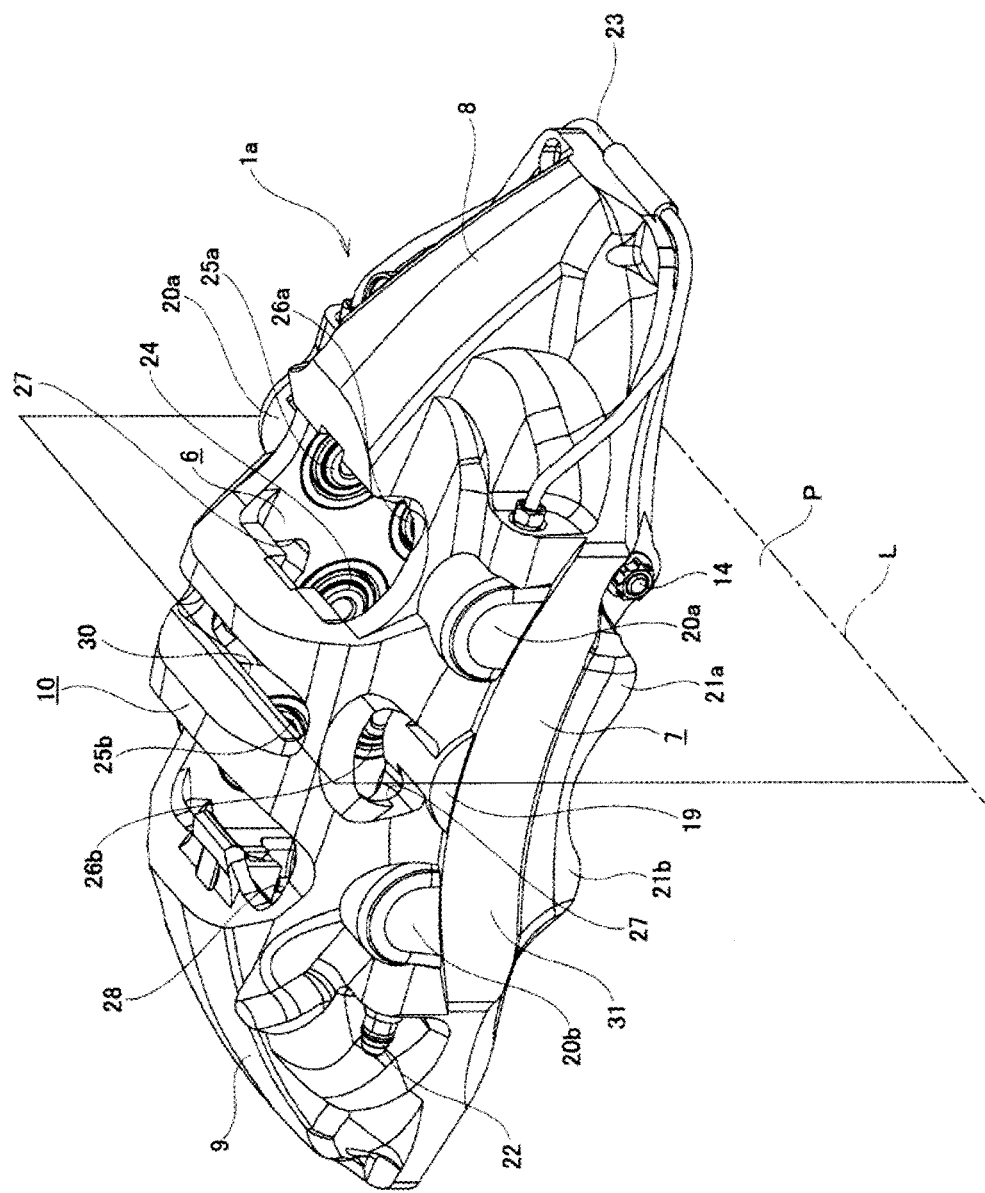
FIG. 7 is a perspective view of the opposed-piston disc brake according to the first embodiment of the present invention as viewed from the radially outer side, the axially outer side, and a rotation-in side.
Figure 8:
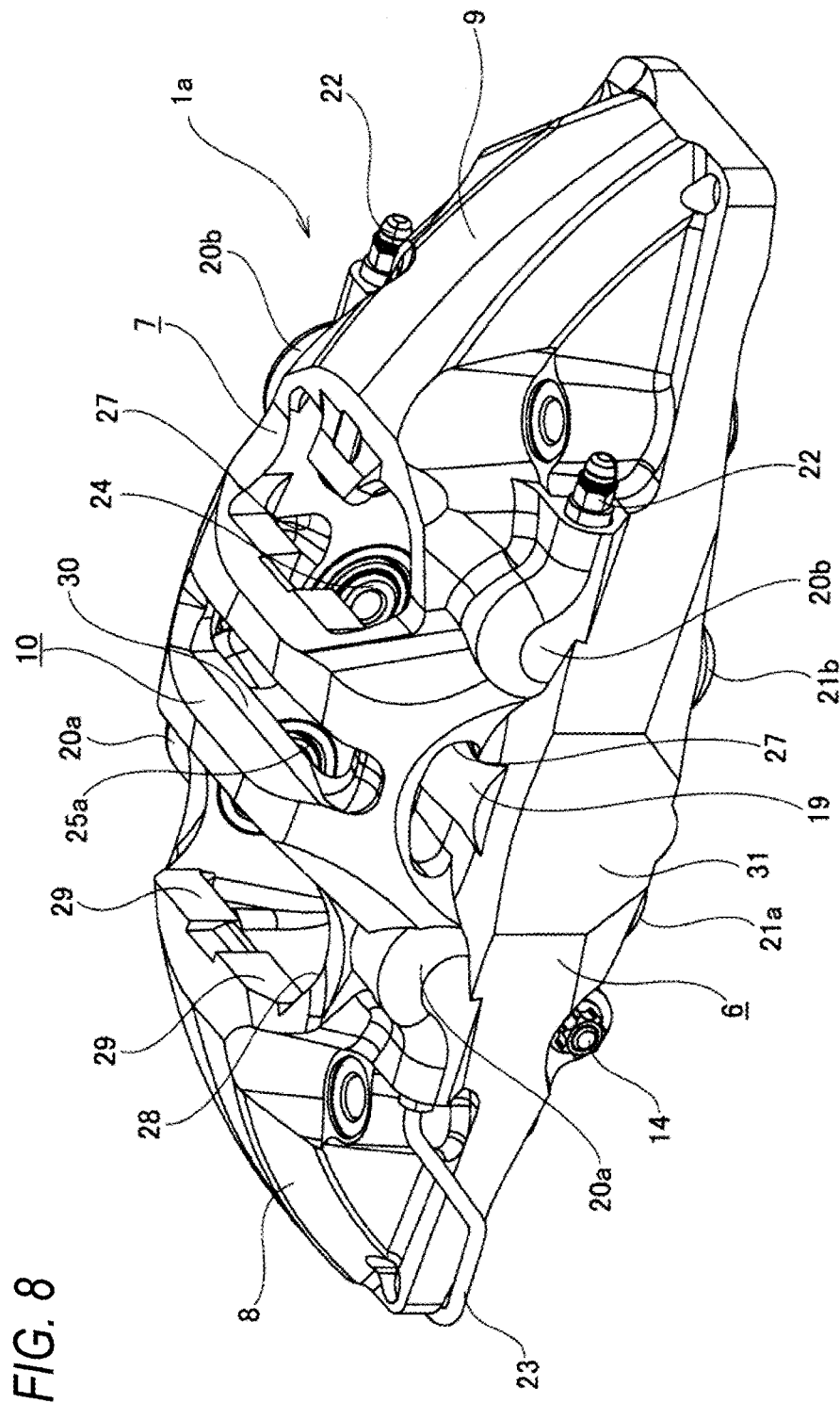
FIG. 8 is a perspective view of the opposed-piston disc brake according to the first embodiment of the present invention as viewed from the radially outer side, the axially inner side, and a rotation-out side.
Figure 9:
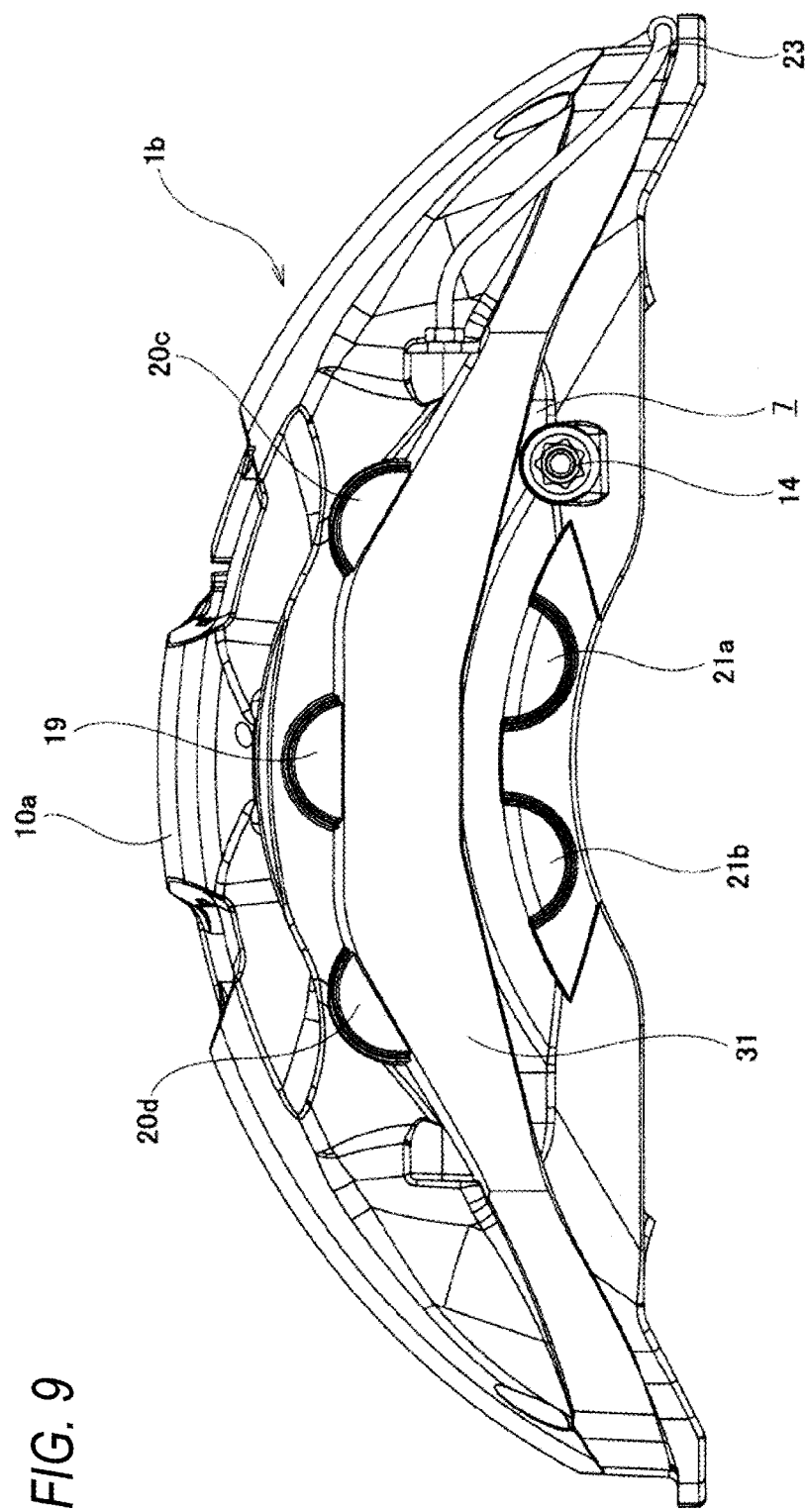
FIG. 9 is a view of an opposed-piston disc brake according to a second embodiment of the present invention as viewed from an axially outer side.
Figure 10:
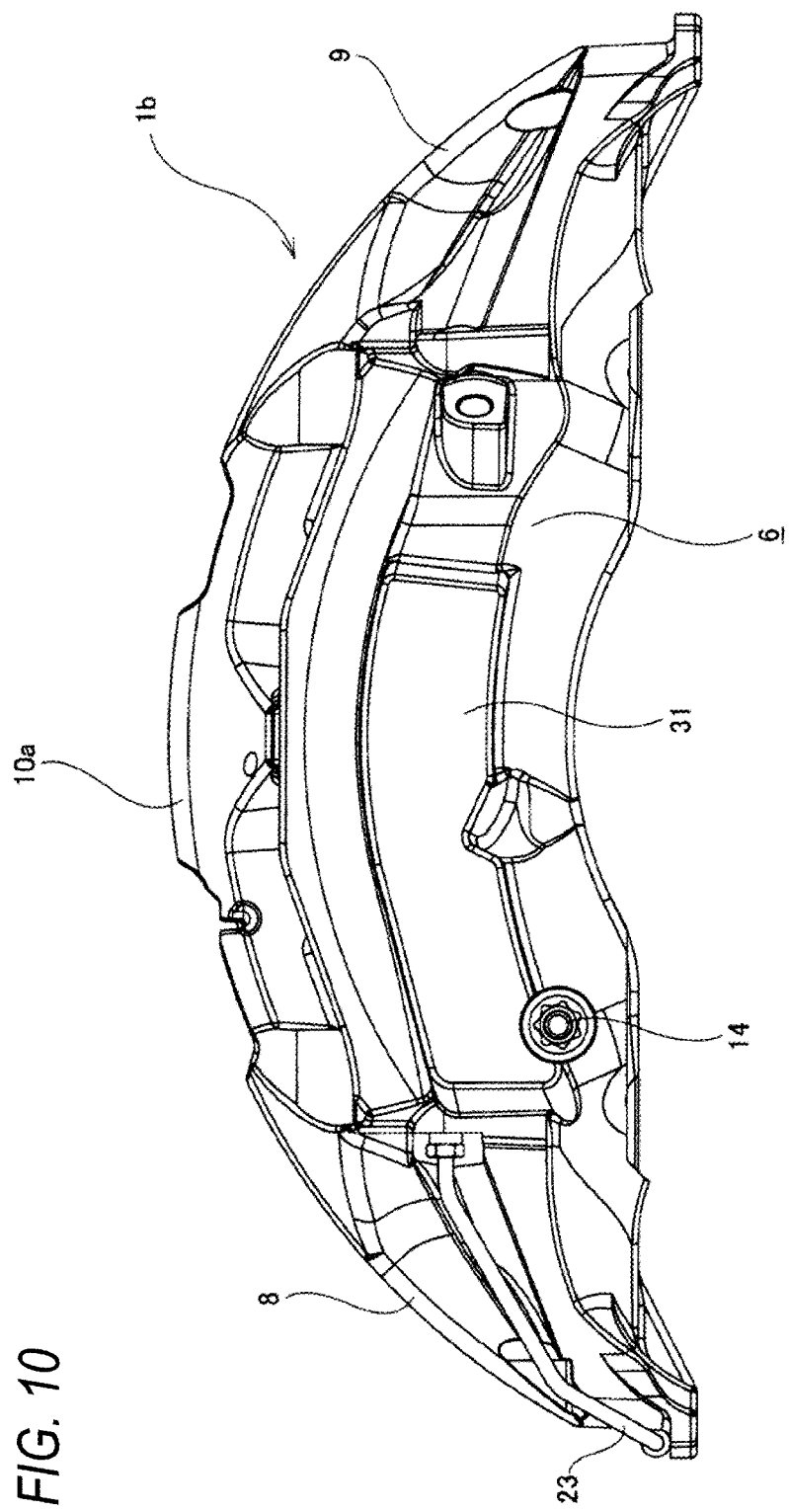
FIG. 10 is a view of the opposed-piston disc brake according to the second embodiment of the present invention as viewed from an axially inner side.
Figure 11:
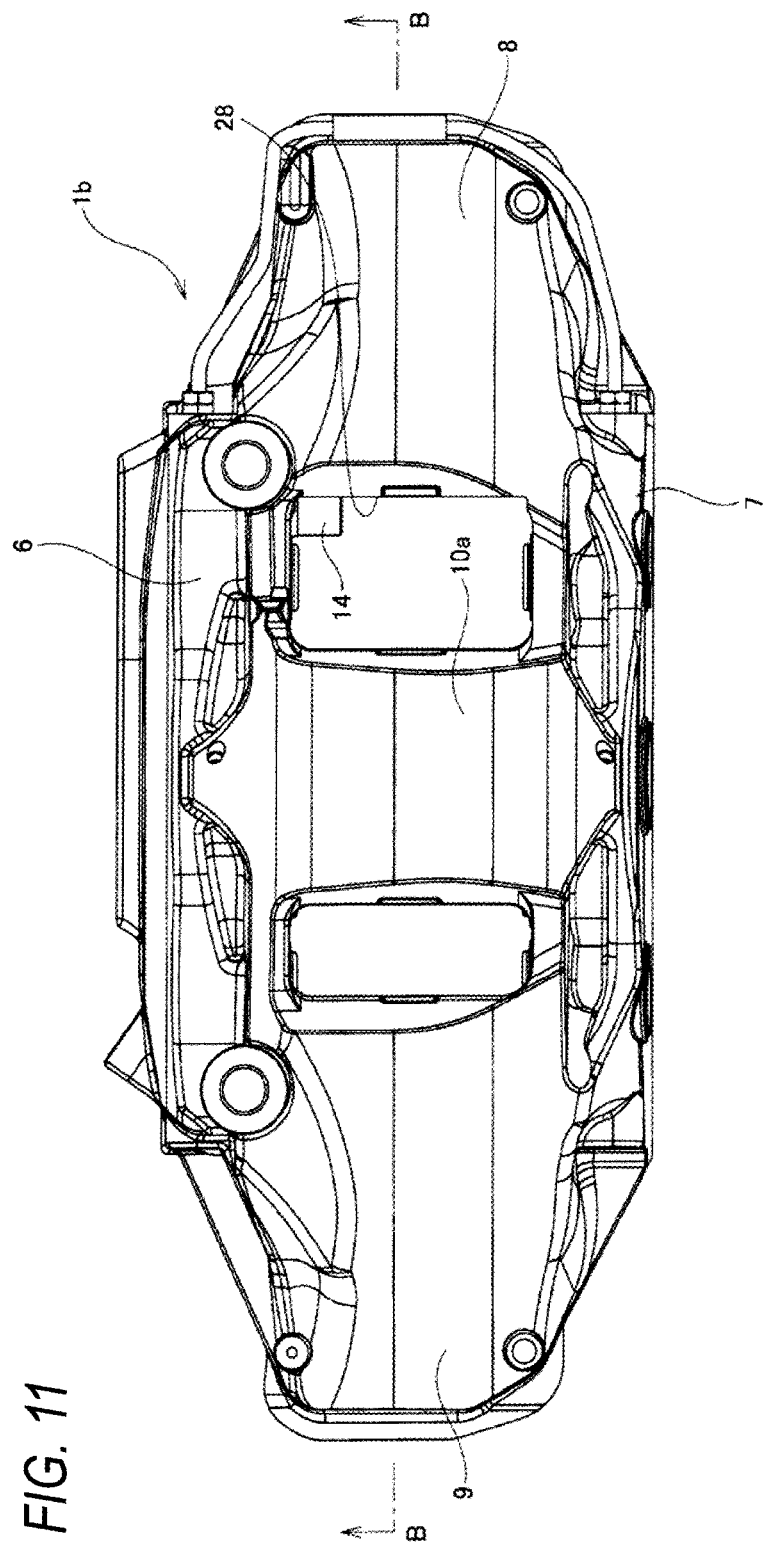
FIG. 11 is a view of the opposed-piston disc brake according to the second embodiment of the present invention as viewed from a radially outer side.
Figure 12:
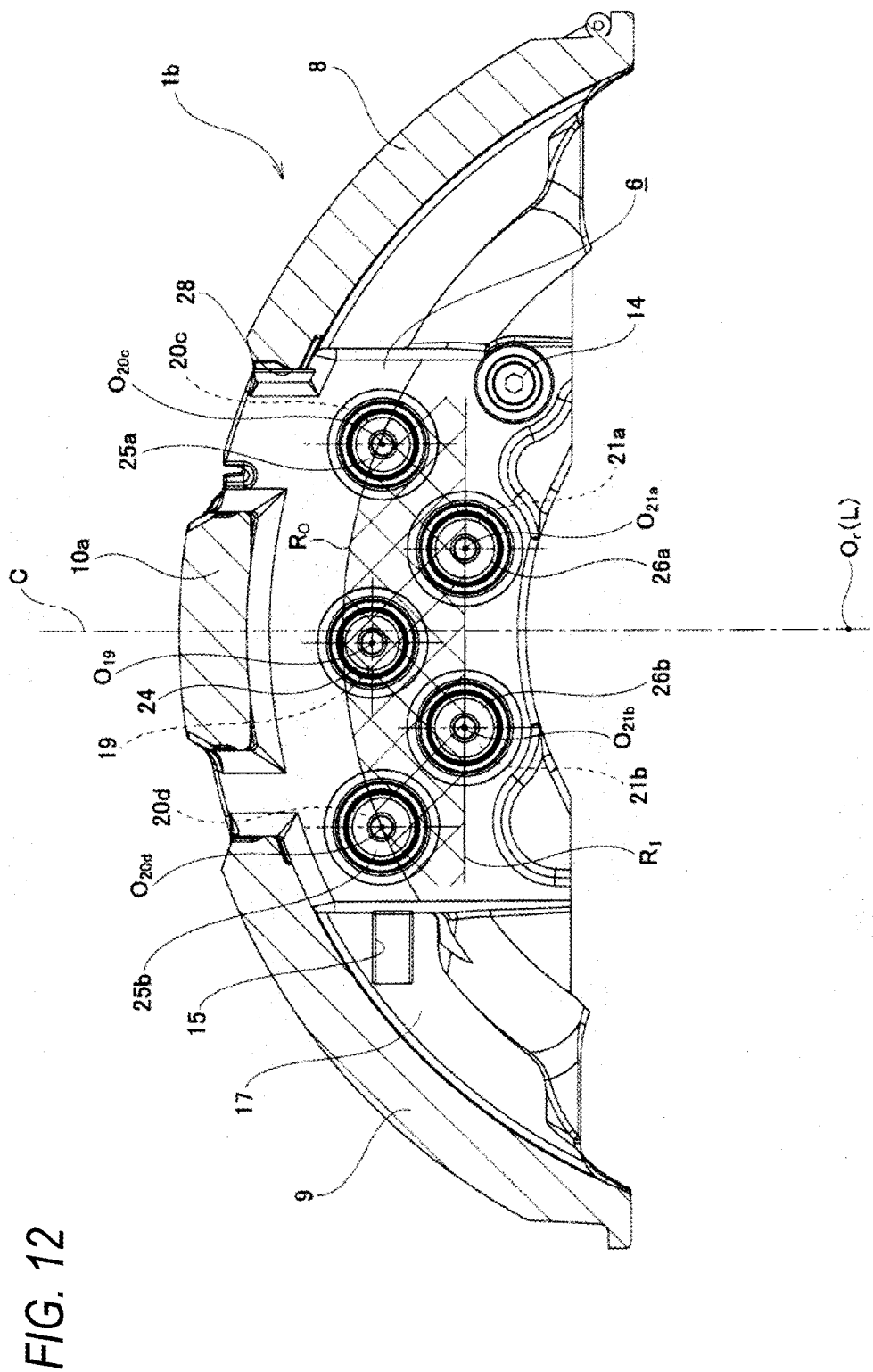
FIG. 12 is a cross-sectional view taken along a line B-B in FIG. 11.
Figure 13:
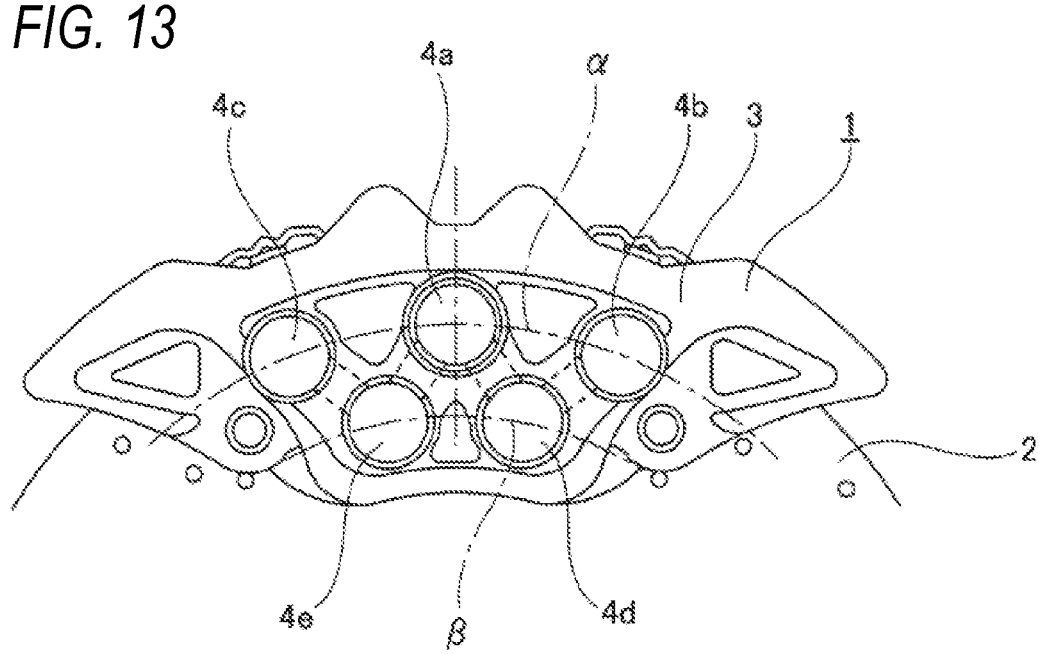
FIG. 13 is a view of a caliper for an opposed-piston disc brake having a structure in the related art as viewed from an axially outer side.

In the present embodiment, the center $O_{19}$ of the central cylinder 19 is located on the radially inner side relative to the outer reference circle $R_O$ and on the radially outer side relative to an inner reference straight line $R_I$ passing through the centers $O_{21a}$, $O_{21b}$ of the two radially inner cylinders 21a, 21b (connecting the centers $O_{21a}$, $O_{21b}$ to each other), and is located in the hatched region in FIG. 5. That is, the center $O_{19}$ of the central cylinder 19 is not provided on an imaginary circle passing through centers of the cylinders (the two radially outer cylinders 20a, 20b in the present embodiment) provided on the radially outermost side as in the structure in the related art, but is located on the radially inner side relative to the imaginary circle. In the present embodiment, the two radially outer cylinders 20a, 20b, the central cylinder 19, and the two radially inner cylinders 21a, 21b are separated in three stages in the radial direction.

Back portions of the five cylinders 19, 20a, 20b, 21a, and 21b of each of the inner body 6 and the outer body 7 are formed with oil passage holes (not shown) in order to supply and discharge pressure oil. The oil passage holes are opened in the back portions of the cylinders 19, 20a, 20b, 21a, and 21b. One end of each of the oil passage holes provided in each of the inner body 6 and the outer body 7 is blocked by a bleeder screw 22 and the other end is communicated with a communication pipe 23. Further, a part of outer shapes of the cylinders 19, 20a, 20b, 21a, and 21b having a bottomed cylindrical shape may be seen on an axially inner surface of the inner body 6 and an axially outer surface of the outer body 7.

Among the five cylinders 19, 20a, 20b, 21a, and 21b, a central piston 24 is fitted to the central cylinder 19 in an oil-tight manner to be displaceable in the axial direction. In addition, radially outer pistons 25a, 25b are fitted to the radially outer cylinders 20a, 20b in an oil-tight manner to be displaceable in the axial direction. Radial inner pistons 26a, 26b are fitted to the radially inner cylinders 21a, 21b in an oil-tight manner to be displaceable in the axial direction.

Each of the inner body 6 and the outer body 7 is provided with a through hole 27 penetrating in the axial direction that is provided on the radially outer side relative to the central cylinder 19 and between the radially outer cylinders 20a, 20b in the circumferential direction. The through hole 27 has an oval shape whose circumferential width is larger than its radial width and a radially inner edge thereof is curved along the central cylinder 19. In the present embodiment, an imaginary plane P intersecting with the central cylinder 19 (passing through at least a part of the central cylinder 19) among imaginary planes including a central axis L of the rotor 2 intersects with the through hole 27 (passes through at least a part of the through hole 27). Accordingly, the central cylinder 19 and the through hole 27 are overlapped in the radial direction. In the illustrated example, an imaginary plane passing through the center $O_{19}$ of the central cylinder 19 passes slightly by a rotation-out side of a center $O_{27}$ of the through hole 27 and does not pass through the center $O_{27}$ of the through hole 27, but may also pass through the center $O_{27}$ of the through hole 27.

The rotation-in connection portion 8 and the rotation-out connection portion 9 are provided on the radially outer side relative to an outer peripheral edge of the rotor 2 and connect two circumferential end portions of the inner body 6 and two circumferential end portions of the outer body 7 to each other. Specifically, the rotation-in connection portion 8 connects a radially outer end of a rotation-in end portion of the inner body 6 and a radially outer end of a rotation-in end portion of the outer body 7 in the axial direction. The rotation-out connection portion 9 connects a radially outer end of a rotation-out end portion of the inner body 6 and a radially outer end of a rotation-out end portion of the outer body 7 in the axial direction. The rotation-in connection portion 8 and the rotation-out connection portion 9 have a partial circular arc shape along the outer peripheral edge of the rotor 2 and cover the rotor 2 from a radially outer side with a predetermined gap therebetween. A part surrounding the periphery of the rotor 2 by the inner body 6, the outer body 7, the rotation-in connection portion 8, and the rotation-out connection portion 9 has an opening 28 having a substantially rectangular shape in a plan view and penetrating in the radial direction.

A part of the rotation-in connection portion 8 that forms a rotation-in end edge of the opening 28 has a flat surface shaped torque receiving surface 29. The torque receiving surface 29 faces a radially outer end of a rotation-in edge portion of the pressure plate 13 and receives a brake tangential force acting on the pair of pads 5 during backward braking.

The center bridge 10 has a rod shape and is provided on the radially outer side relative to the outer peripheral edge of the rotor 2 between the rotation-in connection portion 8 and the rotation-out connection portion 9 in the circumferential direction, so that the circumferentially central portions of the inner body 6 and the outer body 7 are connected in the axial direction. In the present embodiment, the through hole 27 is provided at a radially outer end of the circumferentially central portion of each of the inner body 6 and the outer body 7. Accordingly, two axial end portions of the center bridge 10 are bifurcated across the through hole 27 and distal ends of the two axial end portions are directly connected to the radially outer cylinders 20a, 20b.

The center bridge 10 has a bridge hole 30 penetrating in the radial direction at its circumferentially central portion. The bridge hole 30 has a wide range excluding the two axial end portions of the center bridge 10. In the present embodiment, the imaginary plane P intersecting with the central cylinder 19 and the through hole 27 among the imaginary planes including the central axis L of the rotor 2 intersects with the bridge hole 30 (passes through at least a part of the bridge hole 30). Accordingly, circumferential positions of the central cylinder 19, the through hole 27, and the bridge hole 30 are overlapped in the circumferential direction.

In order to improve the rigidity while preventing an increase in the weight of the caliper 1a, a belt-shaped rib 31 is provided to surround the periphery of the caliper 1a. A part of the belt-shaped rib 31 formed on the axially inner surface of the inner body 6 covers a radially inner part of a bottom portion of each of the radially outer cylinders 20a, 20b, a large part of a bottom portion of the central cylinder 19, and a radially outer part of a bottom portion of each of the radially inner cylinders 21a, 21b from an axially inner side so as to cross these parts in the circumferential direction. A part of the belt-shaped rib 31 formed on the axially outer surface of the outer body 7 covers a radially inner part of a bottom portion of each of the radially outer cylinders 20a, 20b, a radially inner half part of a bottom portion of the central cylinder 19, and a radially outer part of a bottom portion of each of the radially inner cylinders 21a, 21b from an axially outer side so as to cross these parts in the circumferential direction. A surface of the belt-shaped rib 31 is smooth (with no corners) and continuous.

In the present embodiment, in order to stabilize the posture of the pair of pads 5 during non-braking, a pad spring (not shown) is attached to the caliper 1a so that the pair of pads 5 are pressed radially inward. The pad spring can prevent the pair of pads 5 from being pressed in directions away from each other in the axial direction and prevent the lining 12 from being brought into sliding contact with the axial side surface of the rotor 2 during non-braking. By arranging a part of the pad spring to a sliding portion between the torque receiving surface 29 and the rotation-in edge portion of the pressure plate 13, it is also possible to prevent the sliding portion from rusting.

Also in the case of the opposed-piston disc brake according to the present embodiment having the above-described configuration, oil is supplied to the five cylinders 19, 20a, 20b, 21a, and 21b during braking and the five pistons 24, 25a, 25b, 26a, and 26b are pushed out. Accordingly, linings 12 of the pair of pads 5 supported on the inner body 6 and the outer body 7 are pressed against the axial side surfaces of the rotor 2. Accordingly, braking is performed by friction between the pair of pads 5 and the two axial side surfaces of the rotor 2 since the rotor 2 is strongly clamped by the pair of pads 5 from its two axial sides.

Particularly, in the present embodiment, it is possible to prevent uneven wear of the pair of pads 5 relative to the caliper 1a having five cylinders in each of the inner body 6 and the outer body 7.

That is, in the present embodiment, since the center $O_{19}$ of the central cylinder 19 is located on the radially inner side relative to the outer reference circle $R_O$ passing through the centers $O_{20a}$, $O_{20b}$ of the two radially outer cylinders 20a, 20b provided on the radially outermost side, the position of the central cylinder 19 is on the radially inner side relative to that in the structure in the related art. Accordingly, a pressing position of the central piston 24 is on a radially inner side of each of the pair of pads 5 and it is possible to reduce the amount of wear in a radially outer part of the lining 12. Further, in the present embodiment, the center $O_{19}$ of the central cylinder 19 is located on the radially outer side relative to the inner reference line $R_I$ passing through the centers $O_{21a}$, $O_{21b}$ of the two radially inner cylinders 21a, 21b. For this reason, a pressing position of the central piston 24 is prevented from being excessively on a radially inner side of each of the pair of pads 5 and the amount of wear in a radially inner part of the lining 12 would not become excessively large. Therefore, in the present embodiment, uneven wear of the lining 12 can be prevented. As a result, the temperature rise of the disc brake caused by the uneven wear of the lining 12 can be prevented and the braking performance and the acoustic noise performance can be well ensured.

Moreover, as described above in this embodiment, since the center $O_{19}$ of the central cylinder 19 is located on the radially inner side relative to the outer reference circle $R_O$, no cylinder is necessary at the radially outer ends of the circumferentially central portions of the inner body 6 and the outer body 7. Therefore, in the present embodiment, the through hole 27 penetrating in the axial direction is formed at the radially outer ends of the circumferentially central portions of the inner body 6 and the outer body 7. For this reason, the weight of the caliper 1a can be reduced and the cooling performance of the pair of pads 5 can be improved.

Further, since the bridge hole 30 penetrating in the radial direction is provided in the center bridge 10, the caliper 1a can be further reduced in weight and the cooling performance of the pad 5 can be improved. It is also possible to assemble a wear indicator from a radially outer side to an attachment hole 32 provided in a circumferentially central portion of an outer peripheral edge portion of the pair of pads 5 through the bridge hole 30. Therefore, the pair of pads 5 can be shared.

In the present embodiment, the circumferentially central portions of the inner body 6 and the outer body 7 are connected to each other by the center bridge 10 and the axial end portions (the bifurcated distal ends) of the center bridge 10 are directly connected to the radially outer cylinders 20a, 20b. For this reason, the rigidity of the caliper 1a can be improved when the inner body 6 and the outer body 7 are displaced (opened) in directions away from each other. The rigidity of the caliper 1a can be further improved by surrounding the periphery of the caliper 1a with the belt-shaped rib 31.

Second Embodiment

A second embodiment of the present invention will be described with reference to FIGS. 9 to 12.

A caliper 1b for an opposed-piston disc brake according to the present embodiment has a configuration emphasizing rigidity as compared with the caliper 1a according to the first embodiment. That is, the inner body 6 and the outer body 7 constituting the caliper 1b have no through hole penetrating in the axial direction and being on the radially outer side relative to the central cylinder 19 as in the first embodiment.

A center bridge 10a connecting a circumferentially central portion of the inner body 6 and a circumferentially central portion of the outer body 7 has a larger width in the circumferential direction as compared with the structure according to the first embodiment, and has no bridge hole penetrating in the radial direction.

In the present embodiment, centers $O_{20c}$, $O_{20d}$ of two radially outer cylinders 20c, 20d provided on the radially outer side relative to the central cylinder 19 are not located on the same imaginary circle centered on the center $O_r$ of the rotor 2 (see FIG. 5). Specifically, the radially outer cylinder 20d on the other circumferential side is located on the radially outer side relative to the radially outer cylinder 20c on one circumferential side. For this reason, in the present embodiment, the center $O_{19}$ of the central cylinder 19 is located on the radially inner side relative to the outer reference circle $R_O$ passing through the center $O_{20d}$ of the radially outer cylinder 20d located at a radially outermost side. The center $O_{19}$ of the central cylinder 19 is located on the radially outer side relative to the inner reference line $R_I$ passing through the centers $O_{21a}$, $O_{21b}$ of the two radially inner cylinders 21a, 21b. Therefore, even in the present embodiment, uneven wear of the lining 12 (see FIG. 6) can be prevented. As compared with the structure according to the first embodiment, it is also possible to improve the rigidity of the caliper 1b when the inner body 6 and the outer body 7 displace in directions away from each other.

Other configurations and operational effects are the same as those of the first embodiment.

When implementing the present invention, a caliper for an opposed-piston disc brake may be a monocoque structure (an integrated structure) integrally formed of a material such as an aluminum alloy or a structure including an inner member and an outer member connected by bolts.

Further, when implementing the present invention, a support structure of an inner pad and an outer pad is not limited to the structure in the above embodiments and a structure known in the related art can be adopted.

Features of the above embodiments of the caliper for an opposed-piston disc brake according to the present invention are briefly summarized below.

[1] A caliper for an opposed-piston disc brake, the caliper including: a pair of bodies provided at two sides of a rotor that rotates with a wheel, each of the pair of bodies including five cylinders, wherein
a central cylinder among the five cylinders provided on each of the pair of bodies, which is surrounded by four of the cylinders, has a center which is located in a region on a radially inner side relative to an outer reference circle and on a radially outer side relative to an inner reference line, the outer reference circle passes through a center of a cylinder provided on a radially outermost side among the four of the cylinders and has a center thereof on a center of the rotor, and the inner reference line passes through centers of two cylinders provided on a radially inner side among the four of the cylinders.

[2] The caliper for an opposed-piston disc brake according to [1], wherein
each of the pair of bodies has a through hole on the radially outer side relative to the central cylinder provided on each of the pair of bodies, and the through hole penetrates in an axial direction.

[3] The caliper for an opposed-piston disc brake according to [2], wherein
an imaginary plane intersecting with the central cylinder among imaginary planes including a central axis of the rotor intersects with the through hole.

[4] The caliper for an opposed-piston disc brake according to [3], wherein
the imaginary plane passes through the center of the central cylinder and a center of the through hole.

[5] The caliper for an opposed-piston disc brake according to any one of [3] and [4], wherein
a center bridge is provided on a radially outer side relative to an outer peripheral edge of the rotor and connects circumferentially central portions of the pair of bodies to each other, a bridge hole is provided on the center bridge and penetrates in a radial direction, and an imaginary plane among the imaginary planes including the central axis of the rotor, which intersects with the bridge hole, intersects with the central cylinder provided on each of the pair of bodies and the through hole.

The present invention is not limited to the above-described embodiments and may be appropriately modified, improved, or the like. Additionally, materials, shapes, sizes, numbers, arrangement locations, and the like of elements in the above embodiments are optional and are not limited as long as the present invention can be implemented.

The present application is based on a Japanese patent application (JP-A-2017-170802) filed on Sep. 6, 2017, contents of which are incorporated herein by reference.

INDUSTRIAL APPLICABILITY

According to the caliper for an opposed-piston disc brake of the present invention, it is possible to prevent uneven wear of pads relative to the caliper for an opposed-piston disc brake including five cylinders in each of a pair of bodies.

REFERENCE SIGNS LIST 1, 1a, 1b caliper
2 rotor
3 body
4a to 4e cylinder
5 pad
6 inner body
7 outer body
8 rotation-in connection portion
9 rotation-out connection portion
10, 10a center bridge
11 attachment portion
12 lining
13 pressure plate
14 pad pin
15 guide groove
16 through hole
17 guide wall portion
18 ear portion
19 central cylinder
20a, 20b, 20c, 20d radially outer cylinder
21a, 21b radially inner cylinder
22 bleeder screw
23 communication pipe
24 central piston
25a, 25b radially outer piston
26a, 26b radially inner piston
27 through hole
28 opening
29 torque receiving surface
30 bridge hole
31 belt-shaped rib
32 attachment hole

The invention claimed is:

1. A caliper for an opposed-piston disc brake, the caliper comprising:
a pair of bodies provided at two sides of a rotor that rotates with a wheel, each of the pair of bodies including five cylinders, wherein
a central cylinder among the five cylinders provided on each of the pair of bodies, which is surrounded by four of the cylinders, has a center which is located in a region on a radially inner side relative to an outer reference circle and on a radially outer side relative to an inner reference line, the outer reference circle passes through a center of a cylinder provided on a radially outermost side among the four of the cylinders and has a center thereof on a center of the rotor, and the inner reference line passes through centers of two of the cylinders provided on a radially inner side among the four of the cylinders.

2. The caliper for an opposed-piston disc brake according to claim 1, wherein
   each of the pair of bodies has a through hole on the radially outer side relative to the central cylinder provided on each of the pair of bodies, and
   the through hole penetrates in an axial direction.

3. The caliper for an opposed-piston disc brake according to claim 2, wherein
   an imaginary plane intersecting with the central cylinder, among imaginary planes including a central axis of the rotor, intersects with the through hole.

4. The caliper for an opposed-piston disc brake according to claim 3, wherein
   the imaginary plane passes through the center of the central cylinder and a center of the through hole.

5. The caliper for an opposed-piston type disc brake according to claim 3, wherein
   a center bridge is provided on a radially outer side relative to an outer peripheral edge of the rotor and connects circumferentially central portions of the pair of bodies to each other,
   a bridge hole is provided on the center bridge and penetrates in a radial direction, and
   an imaginary plane among the imaginary planes including the central axis of the rotor, which intersects with the bridge hole, intersects with the central cylinder provided on each of the pair of bodies and the through hole.

* * * * *